US012610374B2

(12) United States Patent
Yang et al.

(10) Patent No.: US 12,610,374 B2
(45) Date of Patent: Apr. 21, 2026

(54) CSS MONITORING METHOD AND TERMINAL

(71) Applicant: VIVO MOBILE COMMUNICATION CO.,LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 372 days.

(21) Appl. No.: 18/105,954

(22) Filed: Feb. 6, 2023

(65) Prior Publication Data

US 2023/0189289 A1 Jun. 15, 2023

Related U.S. Application Data

(63) Continuation of application No. PCT/CN2021/110507, filed on Aug. 4, 2021.

(30) Foreign Application Priority Data

Aug. 7, 2020 (CN) .......................... 202010790276.X

(51) Int. Cl.
*H04W 72/23* (2023.01)
*H04W 72/232* (2023.01)

(52) U.S. Cl.
CPC ................................. *H04W 72/232* (2023.01)

(58) Field of Classification Search
CPC .................................................. H04W 72/232
See application file for complete search history.

(56) References Cited

U.S. PATENT DOCUMENTS

| | | | |
|---|---|---|---|
| 10,805,872 B2 | 10/2020 | Yi et al. | |
| 10,849,187 B2 | 11/2020 | Tsai et al. | |
| 2019/0342907 A1 | 11/2019 | Huang et al. | |
| 2020/0146059 A1 | 5/2020 | Cirik et al. | |
| 2020/0305037 A1* | 9/2020 | Zou ..................... | H04W 36/324 |
| 2021/0076395 A1* | 3/2021 | Zhou ..................... | H04W 76/15 |
| 2021/0243680 A1 | 8/2021 | Harada et al. | |
| 2022/0006575 A1* | 1/2022 | Cozzo ................. | H04W 72/046 |

FOREIGN PATENT DOCUMENTS

| | | |
|---|---|---|
| CN | 102685821 A | 9/2012 |
| CN | 110446269 A | 11/2019 |
| CN | 110754127 A | 2/2020 |
| CN | 111327411 A | 6/2020 |
| EP | 3726904 B1 | 2/2023 |
| WO | 2019215872 A1 | 11/2019 |

(Continued)

OTHER PUBLICATIONS

3GPP, Technical Specification Group Radio Access Network, 3GPP TS 38.213, Jun. 2020, v15.10.0.

(Continued)

*Primary Examiner* — Ronald B Abelson
(74) *Attorney, Agent, or Firm* — The Webb Law Firm

(57) ABSTRACT

A CSS monitoring method, includes: monitoring, by a terminal, a PDCCH candidate on a CSS set, where the terminal uses same first information as an anchor node, or uses same first information as a cell/TRP associated with the CSS set.

15 Claims, 2 Drawing Sheets

12

Network side device

11 Terminal

11 Terminal

(56) References Cited

FOREIGN PATENT DOCUMENTS

| WO | 2020032773 A1 | 2/2020 |
| WO | 2020032774 A1 | 2/2020 |

OTHER PUBLICATIONS

NTT Docomo, Inc., "Draft CR on TS38.213 on CORESET 0", 3GPP TSG RAN WG1 Meeting #95, Nov. 12-16, 2018, R1-1814052.

ZTE, "Discussion on NR Mobility Enhancements in Physical Layer", 3GPP TSG RAN WG1 Meeting #99, Nov. 18-22, 2019, R1-1911975.

3rd Generation Partnership Project, Technical Specification Group Radio Access Network, NR, Physical layer procedures for control, Jun. 2020, 3GPP TS 38.213, V. 16.2.0.

NTT Docomo, Inc., "Offline summary for PDCCH structure and search space", 3GPP TSG RAN WG1 Meeting #94, Gothenburg, Sweden, Aug. 20-24, 2018, R1-1809855.

VIVO, "Misalignment of CSS in PBCH and dedicated signaling", 3GPP TSG-RAN WG2 Meeting #101bis, Sanya, China, Apr. 20, 2018, R2-1804882.

* cited by examiner

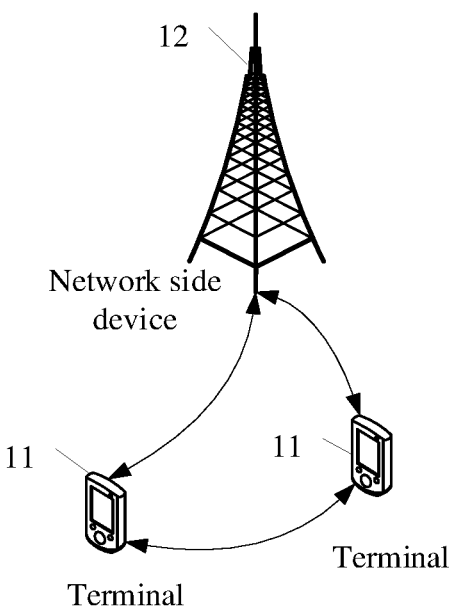
Network side
device
11          11
Terminal
Terminal
FIG. 1
200
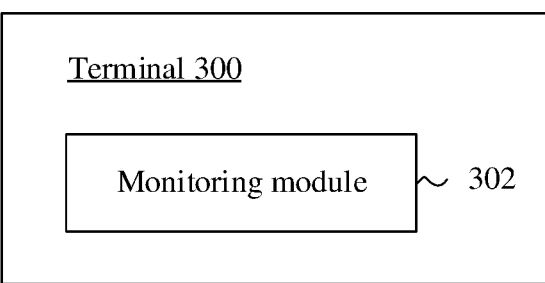
The terminal monitors a PDCCH candidate on a CSS set, where the
terminal uses same first information as an anchor node, or uses same
first information as a cell/TRP associated with the CSS set    ∽ S202
FIG. 2
Terminal 300
Monitoring module    ∽ 302
FIG. 3

CSS MONITORING METHOD AND TERMINAL

CROSS-REFERENCE TO RELATED APPLICATIONS

This application is a Bypass Continuation Application of PCT/CN2021/110507 filed Aug. 4, 2021, and claims priority to Chinese Patent Application No. 202010790276.X filed Aug. 7, 2020, the disclosures of which are incorporated by reference in their entireties.

BACKGROUND OF THE INVENTION

Field of the Invention

This present disclosure relates to the field of communication technologies, and in particular, to a common search space (CSS) monitoring method and a terminal.

Description of Related Art

Search space may be classified into CSS and UE specific search space (USS). CSS is a common search space in a cell, shared by all users in the cell, and is mainly used for transmission of broadcast information. Due to particularity of the CSS, corresponding monitoring restrictions are required in mobile scenarios such as cell switching. However, no effective CSS monitoring solution is provided in the related art, easily causing the problem such as mismatch of transmission parameters.

SUMMARY OF THE INVENTION

According to a first aspect, a CSS monitoring method is provided, including: monitoring, by a terminal, a physical downlink control channel PDCCH candidate on a CSS set, where the terminal uses same first information as an anchor node, or uses same first information as a cell/transmitting receiving point TRP associated with the CSS set.

According to a second aspect, a terminal is provided, including: a monitoring module, configured to monitor a physical downlink control channel PDCCH candidate on a CSS set, where the monitoring module uses same first information as an anchor node, or uses same first information as a cell/TRP associated with the CSS set.

According to a third aspect, a terminal is provided, including a processor, a memory, and a program or an instruction stored on the memory and executable on the processor, where the program or the instruction, when executed by the processor, implements the method according to the first aspect.

According to a fourth aspect, a non-transitory readable storage medium is provided, storing a program or an instruction, where the program or the instruction, when executed by a processor, implements the method according to the first aspect.

According to a fifth aspect, a chip is provided, including a processor and a communication interface, where the communication interface is coupled to the processor, and the processor is configured to run a program or an instruction to implement the method according to the first aspect.

BRIEF DESCRIPTION OF THE DRAWINGS

FIG. 1 is a block diagram of a wireless communication system according to an embodiment of this application;

FIG. 2 is a schematic flowchart of a CSS monitoring method according to an embodiment of this application;

FIG. 3 is a schematic structural diagram of a terminal according to an embodiment of this application;

DESCRIPTION OF THE INVENTION

Figure 4:
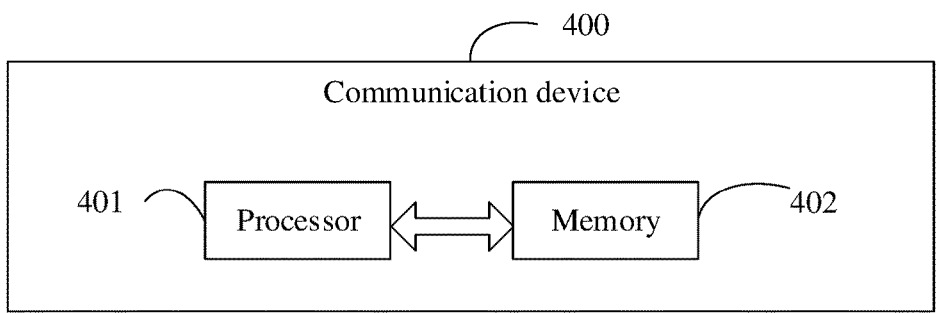
FIG. 4 is a schematic structural diagram of a communication device according to an embodiment of this application.

The technical solutions in embodiments of this application are clearly and described in the following with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

In the specification and claims of this application, the terms "first", "second" and the like are used to distinguish similar objects, but are not used to describe a specific order or sequence. It should be understood that terms used in this way are interchangeable in proper circumstances, so that the embodiments of this application can be implemented in an order other than the order illustrated or described herein. Objects distinguished by "first" and "second" are usually of the same kind, and a quantity of the objects is not limited, for example, there may be one or more first objects. In addition, "and/or" in the specification and the claims represents at least one of connected objects and a character "/" generally indicates an "or" relationship between associated objects.

It should be noted that the technologies described in the embodiments of this application are not limited to a long term evolution (LTE)/LTE advanced (LTE-A) system, or may be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the described technologies can be applied to the systems and radio technologies mentioned above, or can be applied to other systems and radio technologies. However, the following descriptions describe a new radio (NR) system for illustration purpose, and NR terms are used in most of the descriptions below. These technologies may also be applied to applications other than NR system applications, such as a 6-th generation (6G) communication system.

FIG. 1 is a block diagram of a wireless communication system to which the embodiments of this application are applicable. The wireless communication system includes a terminal 11 and a network side device 12. The terminal 11 may also be referred to as a terminal device or user equipment (UE). The terminal 11 may be a mobile phone, a tablet personal computer, a laptop computer, or referred to as a terminal side device such as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: a bracelet, headphones, glasses, or the like. It should be noted that a type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP), or some other proper terms in the field. Provided that the same technical effect is achieved, the base station is not limited to a technical word. It should be noted that a base station in the NR system is used only as an example in the embodiments of this application, but a type of the base station is not limited.

A common search space (CSS) monitoring method and a terminal provided in the embodiments of this application are described in detail below with reference to the accompanying drawings by using some embodiments and application scenarios thereof.

As shown in FIG. 2, an embodiment of this application provides a CSS monitoring method 200, which may be performed by a terminal. In other words, the method may be performed by software or hardware installed on the terminal, and the method includes the following steps.

S202: The terminal monitors a physical downlink control channel (PDCCH) candidate on a CSS set, where the terminal uses same first information as an anchor node, or uses same first information as a cell or a transmitting receiving point associated with the CSS set.

S202 may be applied to mobile scenarios, such as cell switching, inter-cell MTRP switching, and intra-cell MTRP switching.

Optionally, the first information may include at least one of the following: cell configuration information; related configuration information of the CSS set; beam information; a default beam; a pathloss reference signal; timing-related information; scrambling information; or a radio network temporary identity (RNTI).

In a case that the terminal uses the same first information as the anchor node mentioned in this embodiment, for example, the first information is the default beam, the terminal uses the default beam of the anchor node to monitor the PDCCH candidate on the CSS set. In another example, in a case that the first information is the cell configuration information, the terminal uses the cell configuration information of the anchor node to monitor the PDCCH candidate on the CSS set.

The using the same first information as the cell/TRP associated with the CSS set mentioned in this embodiment includes: for example, using same first information as the TRP/cell with/to which the CSS set is associated/belongs to monitor the PDCCH candidate on the CSS set. For example, the terminal uses the default beam of the cell/TRP associated with the CSS set to monitor the PDCCH candidate on the CSS set. In another example, the terminal uses the timing-related information of the cell/TRP associated with the CSS set to monitor the PDCCH candidate on the CSS set.

The TRP/cell with/to which the CSS set is associated/belongs mentioned in this embodiment may be that, for example, the CSS set that is configured by a TRP/cell is associated with/belongs to the TRP/cell that provides the configuration; or the CSS set that is configured with a control resource set pool index (CORESETPpoolIndex)/TRP identifier (ID) of a TRP, or configured with a physical cell identifier (PCI) of a cell or other cell identifier information or associated information is associated with/belongs to the TRP/cell corresponding to the CORESETPoolIndex/TRP identifier or the PCI.

In this embodiment of this application, a terminal may use same first information as an anchor node or use same first information as a cell/TRP associated with a CSS set to monitor a PDCCH candidate on the CSS set, which can avoid the problem such as mismatch of transmission parameters and improve communication effectiveness.

Optionally, using the same first information as the anchor node, or using the same first information as the cell/TRP associated with the CSS set mentioned in the method 200 may include at least one of the following 1) to 5):

1) That use the same first information as the anchor node in a case that the terminal monitors a PDCCH candidate on a type Type0-PDCCH CSS set.

In this example, the terminal may be configured to receive a system information block 1 SIB1) by monitoring the PDCCH candidate on the Type0-PDCCH CSS set.

For example, the terminal uses the default beam of the anchor node to monitor the PDCCH candidate on the Type0-PDCCH CSS set.

2) That use the same first information as the anchor node in a case that the terminal monitors a PDCCH candidate on a TypeOA-PDCCH CSS set.

In this example, the terminal may be configured to receive other system information blocks (SIBs) by monitoring the PDCCH candidate on the TypeOA-PDCCH CSS set, where the other SIBs may be SIBs other than the SIB1.

3) That u the same first information as the cell/TRP associated with the Type1-PDCCH CSS set in a case that the terminal monitors a PDCCH candidate on a Type 1-PDCCH CSS set.

In this example, by monitoring the PDCCH candidate on the Type1-PDCCH CSS set, the terminal may be configured to receive a random access (RA) message 2 (msg2) and message 4 (msg4) scheduled by a network side device, or may be configured to receive a random access message B (msgB) scheduled by the network side device.

4) That u the same first information as the anchor node, or uses the same first information as the cell/TRP associated with the Type2-PDCCH CSS setin a case that the terminal monitors a PDCCH candidate on a Type2-PDCCH CSS set.

In this example, the terminal may be configured to receive a paging message by monitoring the PDCCH candidate on the Type2-PDCCH CSS set.

5) That u the same first information as the cell/TRP associated with the Type3-PDCCH CSS set in a case that the terminal monitors a PDCCH candidate on a Type3-PDCCH CSS set.

In this example, the terminal may be configured to achieve more functions by monitoring the PDCCH candidate on the Type3-PDCCH CSS set. These functions may be distinguished by different scrambling information, and the scrambling information includes, such as an indication preemption radio network temporary identity (Indication preemption-RNTI, INT-RNTI); a slot format indication radio network temporary identity (SFI-RNTI); a transmission power control physical uplink shared channel radio network temporary identity (TPC-PUSCH-RNTI); a transmission power control physical uplink control channel radio network temporary identity (TPC-PUCCH-RNTI), and a transmission power control sounding reference signal radio network temporary identity (TPC-SRS-RNTI); and a cancellation indication radio network temporary identity (Cancellation indication-RNTI, CI-RNTI), and a persistent scheduling radio network temporary identity (PS-RNTI).

Optionally, the first information mentioned in the foregoing embodiments is used in at least one of the following cases or scenarios:

1) A case that the terminal monitors the PDCCH candidate on the CSS set, that is, a case that S202 is performed. For example, the first information is used in a case that the terminal monitors the PDCCH candidate on the CSS set on a downlink band width part (BWP).

2) A case that the terminal transmits a target channel or signal, where the target channel or signal is scheduled by/associated with downlink control information (DCI) monitored on the PDCCH candidate. For example, the first information is used in a case that the terminal transmits the target channel or signal.

The target channel or signal may include one of the following: a physical downlink shared channel (PDSCH), a channel state information-reference signal (CSI-RS), a synchronization signal and PBCH block (SSB), a physical uplink shared channel (PUSCH), a physical uplink control channel (PUCCH), a sounding reference signal (SRS), or a physical random access channel (PRACH).

Optionally, in the foregoing embodiments, in a case that the terminal uses the same first information as the cell/TRP associated with the CSS set, the terminal does not use first information of a cell/TRP unassociated with the CSS set.

In an example, the first information includes a transmission configuration indicator (TCI), where a reference signal indicated by a TCI identifier of the CSS set belongs to the cell/TRP associated with the CSS set; and the reference signal indicated by the TCI identifier of the CSS set does not belong to the cell/TRP unassociated with the CSS set. For example, a network configures two sets of TCI lists, and there are repeated TCI identifiers in the two sets of TCI lists. A TCI list 1 is used for a cell 1, and a TCI list 2 is used for a cell 2. In a case that the CSS set uses same first information as the cell 1, the TCI identifier of the CSS set corresponds to quasi-co-location information or reference signal corresponding to a corresponding TCI identifier in the TCI list 1. In a case that the CSS set uses same first information as the cell 2, the TCI identifier of the CSS set corresponds to quasi-co-location information or reference signal corresponding to a corresponding TCI identifier in the TCI list 2.

Optionally, the reference signal indicated by the TCI identifier of the CSS set includes at least one of the following: a reference signal in quasi-co-location information in a TCI identifier configured by a radio resource control (RRC) signaling/element and activated by a media access control-control element (MAC CE) through a network of the CORESET associated with the CSS set; and a reference signal in quasi-co-location information in a TCI identifier in carried information of DCI monitored on the CSS set.

For example, in a case that the first information is a TCI, the network side device may configure the same TCI identifiers for a plurality of cells, and the TCI identifiers point to different quasi-co-location (QCL) reference signals. The TCI identifier of the CSS set can only point to a QCL reference signal of the associated cell/TRP, but cannot point to a QCL reference signal of the unassociated cell/TRP.

As mentioned in the foregoing embodiments, the first information includes at least one of the following: 1) cell configuration information; 2) related configuration information of the CSS set; 3) beam information; 4) a default beam; 5) a pathloss reference signal; 6) timing-related information; 7) scrambling information; or 8) an RNTI.

The content of the first information is described in detail below with reference to multiple examples.

The cell configuration information mentioned in 1) may include at least one of the following: cell group configuration (CellGroupConfig), special cell configuration (SpCellConfig), reconfiguration with synchronization (ReconfigurationWithSync), serving cell configuration (ServingCellConfig), serving cell common configuration (ServingCellConfigCommon), or the like.

The related configuration information of the CSS set mentioned in 2) may include frequency domain information and time domain information. The frequency domain information is related configuration information of a CORESET, such as a frequency domain resource, a period, a control channel element resource element group mapping type (cce-REG-MappingType), pre-coding granularity, a TCI, beam related information, or the like. The time domain information is related configuration information of search space, such as a control resource set identifier (controlResourceSetId), a monitoring slot periodicity and offset (monitoringSlotPeriodicityAndOffset), a period, monitoring symbols within slot (monitoringSymbolsWithinSlot), or the like.

The beam information may be a TCI configured by the network through the RRC, or a TCI configured by the network through the RRC and activated by the MAC CE. The TCI includes QCL information in the TCI identifier, or reference signal in the QCL information in the TCI identifier.

The beam information mentioned in 3) is described below with reference to several examples.

In an example, the first information includes the beam information.

a) For a downlink channel or signal scheduled by/associated with the DCI monitored on the PDCCH candidate, in a case that a network configures/activates/indicates a TCI, the beam information is the TCI of the cell/TRP associated with the CSS set.

For example, for the downlink (DL) signal or channel such as the PDCCH/physical downlink shared channel (PDSCH)/synchronization signal and PBCH block (SSB)/channel state information-reference signal (CSI-RS) scheduled by/associated with the DCI monitored on the PDCCH candidate, in a case that the network configures the TCI, or activates the TCI, or indicates the TCI, the beam information refers to the TCI of the cell/TRP associated with the CSS set. The RS in the TCI refers to the RS in the TCI of the cell/TRP associated with the CSS set because different cells/TRPs may have the same ID of the TCI/RS.

b) For an uplink channel or signal scheduled by/associated with the DCI monitored on the PDCCH candidate, in a case that a network configures/activates/indicates TCI/space-related information, the beam information is the TCI/space-related information of the cell/TRP associated with the CSS set.

For example, for the uplink (UL) signal or channel such as the physical uplink shared channel (PUSCH)/physical uplink control channel (PUCCH)/sounding reference signal (SRS)/physical random access channel (PRACH) scheduled by/associated with the DCI monitored on the PDCCH candidate, in a case that the network side device configures the TCI/space-related information, or activates the TCI/space-related information, or indicates the TCI/space-related information, the beam information is the TCI/space-related information of the cell/TRP associated with the CSS set. The RS in the TCI/space-related information refers to the RS of the associated cell/TRP.

c) In a case that a network configures/activates/indicates TCI/space-related information, an RS in the TCI/space-related information belongs to the cell/TRP associated with the CSS set.

For example, for the DL or UL signal or channel scheduled by/associated with the DCI monitored on the PDCCH candidate, in a case that the network side device configures the TCI/space-related information, or activates the TCI/space-related information, or indicates the TCI/space-related information, the RS in the TCI/space-related information belongs to the cell/TRP associated with the CSS set, or cannot belong to the cell/TRP unassociated with the CSS set.

In another example, the first information includes the default beam, and the default beam meets at least one of the following:

a) For a downlink channel or signal scheduled by/associated with the DCI monitored on the PDCCH candidate, in a case that the network side device does not configure/not activate/not indicate a TCI, the default beam is a beam used by the downlink channel or signal.

For example, for the PDCCH/PDSCH scheduled by/associated with the DCI monitored on the PDCCH candidate, in a case that the network side device does not configure the TCI, or not activate the TCI, or not indicate the TCI, the default beam is a default beam used by the PDCCH/PDSCH.

b) For an uplink channel or signal scheduled by/associated with the DCI monitored on the PDCCH candidate, in a case that the network side device does not configure/not activate/not indicate TCI/space-related information, the default beam is a beam used by the uplink channel or signal.

For example, for the PUSCH/PUCCH/SRS/PRACH scheduled by/associated with the DCI monitored on the PDCCH candidate, in a case that the network side device does not configure the TCI/space-related information, or not activate the TCI/space-related information, or not indicate the TCI/space-related information, the default beam is a default beam used by the PUSCH/PUCCH/SRS/PRACH.

For the default beam mentioned in the foregoing examples, the reference signal associated with the default beam includes at least one of the following: a) a synchronization signal and PBCH block (SSB) during initial access of the cell; b) a quasi-co-location reference signal of a control resource set (CORESET) with a minimum number associated with an active band width part (BWP); c) the quasi-co-location reference signal of the CORESET with the minimum number associated with the active BWP, where the active BWP corresponds to a TRP; d) a quasi-co-location reference signal of the TCI with a minimum number associated with the active BWP; or e) a quasi-co-location reference signal of an active TCI with a minimum number associated with the active BWP.

Optionally, in a case that the network does not configure any beam information and/or TCI information and/or CORESET, the default beam is from the SSB during initial access of the cell.

Optionally, in a case that the network configures/provides the CORESET, the default beam is from the TCI/quasi-co-location information of the CORESET with the minimum number associated with the active BWP.

Optionally, in a case that the network configures/provides the CORESET and configures/activates a plurality of TRPs, the default beam is from the TCI/quasi-co-location information of the CORESET with the minimum number associated with the active BWP, where the active BWP corresponds to the TRP. The TRP identifier may be obtained through the configuration in the CORESET. For example, the TRP identifier may be CORESETPoolIndex in the CORESET, indicating that the CORESET is associated with/belongs to the TRP corresponding to the TRP identifier.

The active BWP corresponds to the TRP, which may mean that the active BWP is the TRP associated with/belonging to the CORESET.

Optionally, in a case that the network does not configure/provide the CORESET but configures the TCI list, the default beam is from the TCI with the minimum number associated with the active BWP.

Optionally, in a case that the network does not configure/provide the CORESET but configures the TCI list and activates at least one TCI, the default beam is from the active TCI with the minimum number associated with the active BWP.

Optionally, the first information includes the default beam, where the network activates use of the default beam, and/or the terminal supports the use of the default beam.

Optionally, the first information includes the default beam, and that the terminal monitors the PDCCH candidate on the CSS set includes: monitoring, by the terminal the PDCCH candidate on the CSS set in a case that a network does not configure/not activate/not indicate the TCI.

For example, for the PDSCH/PUSCH/PUCCH/SRS/PRACH scheduled by/associated with the DCI monitored on the PDCCH candidate, the network side device does not configure the TCI, or not activate the TCI, or not indicate the TCI.

For the pathLoss reference reference signal mentioned in 5), optionally, the pathloss reference reference signal (Path-Loss reference RS, PL RS) is usually used by the PUSCH/PUCCH/SRS/PRACH scheduled by/associated with the DCI monitored on the PDCCH candidate. Optionally, in a case that the network does not configure a PL RS of a corresponding channel or signal, and/or, the network activates the use of a default PL RS, and/or, the network does not configure space-related information of the corresponding channel or signal, the PL RS includes the default PL RS. Optionally, the default PL RS is the same as the reference signal associated with the default beam, or a same set or rule as the reference signal associated with the default beam is used.

For the timing-related information mentioned in 6), for uplink, the timing-related information may be timing information; and for downlink, the timing-related information may be timing advance information. Optionally, the timing information includes a difference between timing information of the cell/TRP and an adjacent cell/TRP, or a difference between the timing advance information.

For the scrambling information mentioned in 7), optionally, the scrambling information includes at least one of the following: a physical downlink control channel demodulation reference signal scrambling identity pdcch-DMRS-ScramblingID; a scrambling identity ScramblingId; a data scrambling identity physical downlink shared channel dataScramblingIdentityPDSCH; a hopping identity hoppingId; or a data scrambling identity physical uplink shared channel dataScramblingIdentityPUSCH.

For example, for the PDCCH, the scrambling information is the pdcch-DMRS-ScramblingID; for example, for the CSI-RS/NZP-CSI-RS, the scrambling information is the ScramblingId; for the PDSCH, the scrambling information is the dataScramblingIdentityPDSCH; for the PUCCH, the scrambling information is the hoppingId; and for the PUSCH, the scrambling information is the dataScramblingIdentityPUSCH.

For the RNTI mentioned in 8), optionally, the RNTI includes at least one of the following: a cell radio network temporary identity C-RNTI; a modulation and coding strategy cell radio network temporary identity mcs-C-RNTI; a configuration scheduling radio network temporary identity CS-RNTI; a system information radio network temporary identity SI-RNTI; a paging radio network temporary identity P-RNTI; a random access radio network temporary identity RA-RNTI; or a temporary cell radio network temporary identity TC-RNTI.

Optionally, the terminal monitors the PDCCH candidate on the CSS set described in the foregoing embodiments is performed in a case that at least one of the following cases is met:

1) At least one CORESET being switched to/associated with a target cell/adjacent cell. For example, a first CORESET is switched to/associated with the target cell/adjacent cell. In another example, any CORESET is switched to/associated with the target cell/adjacent cell.

2) A special TRP being switched to/associated with the target cell/adjacent cell. This example may be subject to a special TRP. Only in a case that the special TRP is switched to/associated with the target cell/adjacent cell, it is considered that an execution condition of S202 is met. If other TRPs are switched to/associated with the target cell/adjacent cell, it is not considered that the execution condition of S202 is met.

3) The anchor node being switched to/associated with the target cell/adjacent cell.

4) The anchor node remaining unchanged, and in a case that there are a plurality of TRPs, a cell associated with a TRP of a non-anchor node is switched to/associated with the target cell/adjacent cell.

5) Configuration information of a new cell being used.

6) The PDCCH being switched to/associated with the target cell/adjacent cell.

7) A special cell (sPcell) being switched to/associated with the target cell/adjacent cell.

The first CORESET mentioned in 1) includes one of the following: a CORESET numbered 0; a CORESET with a minimum number; a CORESET with a maximum number; a CORESET associated with common search space; a CORESET indicated by the network side device; a CORESET reported by the terminal; a CORESET associated with the special TRP; or a predefined CORESET.

The special TRP mentioned in 2) includes one of the following: a TRP numbered 0; a TRP with a minimum number; a TRP with a maximum number; a TRP associated with the common search space; a TRP indicated by the network side device; a TRP reported by the terminal; a predefined TRP; or a TRP associated with a special CORESET of which number is 0, minimum, maximum, or associated with the common search space.

Using the configuration information of the new cell is mentioned in 5). In this example, the configuration information of the new cell may include high-level configuration information and physical layer configuration information.

a) The high-level configuration information includes at least one of the following: cell group configuration CellGroupConfig; special cell configuration SpCell-Config; reconfiguration with synchronization ReconfigurationWithSync; serving cell common configuration ServingCellConfigCommon; or serving cell configuration ServingCellConfig.

b) The physical layer configuration information includes at least one of the following: transmission configuration indicator (TCI) information; quasi-co-location (QCL) information; a pathloss reference reference signal (PathLoss reference RS, PL RS); a random access channel (RACH) resource; scrambling information;

timing information, that is, Timing information; or timing advance information, that is, Timing Advance information.

Optionally, being switched to/associated with the target cell/adjacent cell mentioned in 1), 2), 3), 4), 6), and 7) includes at least one of the following:

a) Cell/TRP identification information of the target cell/adjacent cell being associated/configured in the configuration information. For example, the cell/TRP identification information of the target cell/adjacent cell is configured in the configuration information of the CORESET/TRP/anchor node/PDDCH/beam information of the cell/TCI, or the CORESET/TRP/anchor node/PDDCH/beam information of the cell/TCI is associated with or belongs to the target cell/adjacent cell. In another example, the cell/TRP identification information of the target cell/adjacent cell is configured in the configuration information of the CORESET/TRP/anchor node/PDDCH/cell.

b) Beam reference information being associated with the target cell/adjacent cell. For example, beam reference information of the CORESET/TRP/anchor node/PDDCH/cell is associated with the target cell/adjacent cell.

c) The beam reference information of the associated CORESET being associated with the target cell/adjacent cell. For example, the beam reference information of the CORESET configured/associated by the CORESET/TRP/anchor node/PDDCH/cell is associated with the target cell/adjacent cell.

Optionally, that the cell/TRP identification information of the target cell/adjacent cell is associated/configured in the configuration information includes at least one of the following:

a) The cell/TRP identification information of the target cell/adjacent cell being configured in TCI. For example, the cell/TRP identification information of the target cell/adjacent cell is configured in the TCI configured by/associated with the CORESET/TRP/anchor node/PDDCH/cell.

b) The cell/TRP identification information of the target cell/adjacent cell being configured in a QCL reference signal in the TCI. For example, the cell/TRP identification information of the target cell/adjacent cell is configured in the QCL reference signal in the TCI configured by/associated with the CORESET/TRP/anchor node/PDDCH/cell.

c) The QCL reference signal in the TCI being associated with the target cell/adjacent cell. For example, the QCL reference signal in the TCI configured by/associated with the CORESET/TRP/anchor node/PDDCH/cell is associated with the target cell/adjacent cell.

It should be noted that for the CSS monitoring method provided in this embodiment of this application, an execution body may be a terminal, or a control module in the terminal configured to perform the CSS monitoring method. In the embodiments of this application, the terminal provided in the embodiments of this application is provided by using an example in which the terminal performs the CSS monitoring method.

FIG. 3 is a schematic structural diagram of a terminal according to an embodiment of this application. As shown in FIG. 3, the terminal 300 includes: a monitoring module 302, which may be configured to monitor a PDCCH candidate on a CSS set, where the monitoring module uses same first information as an anchor node, or uses same first information as a cell/TRP associated with the CSS set.

In this embodiment of this application, a terminal may use same first information as an anchor node or use same first information as a cell/TRP associated with a CSS set to monitor a PDCCH candidate on the CSS set, which can avoid the problem such as mismatch of transmission parameters and improve communication effectiveness.

Optionally, as an embodiment, using the same first information as the anchor node, or using the same first information as the cell/TRP associated with the CSS set includes at least one of the following: using the same first information as the anchor node in a case that the monitoring module 302 monitors a PDCCH candidate on a type Type0-PDCCH CSS set; using the same first information as the anchor node in a case that the monitoring module 302 monitors a PDCCH candidate on a Type0A-PDCCH CSS set; using the same first information as the cell/TRP associated with the CSS set in a case that the monitoring module 302 monitors a PDCCH candidate on a Type1-PDCCH CSS set; using the same first information as the anchor node, or using the same first information as the cell/TRP associated with the CSS set in a case that the monitoring module 302 monitors a PDCCH candidate on a Type2-PDCCH CSS set; or using the same first information as the cell/TRP associated with the CSS set in a case that the monitoring module 302 monitors a PDCCH candidate on a Type3-PDCCH CSS set.

Optionally, as an embodiment, the first information is used in at least one of the following cases: a case that the terminal monitors the PDCCH candidate on the CSS set; or a case that the terminal transmits a target channel or signal, where the target channel or signal is scheduled by/associated with DCI monitored on the PDCCH candidate.

Optionally, as an embodiment, in a case that the terminal uses the same first information as the cell/TRP associated with the CSS set, the terminal does not use first information of a cell/TRP unassociated with the CSS set.

Optionally, as an embodiment, the first information includes a transmission configuration indicator TCI, where a reference signal indicated by a TCI identifier of the CSS set belongs to the cell/TRP associated with the CSS set; and the reference signal indicated by the TCI identifier of the CSS set does not belong to the cell/TRP unassociated with the CSS set.

Optionally, as an embodiment, the first information includes at least one of the following: cell configuration information; related configuration information of the CSS set; beam information; a default beam; a pathloss reference reference signal; timing-related information; scrambling information; or RNTI.

Optionally, as an embodiment, the first information includes the beam information, where for a downlink channel or signal scheduled by/associated with the DCI monitored on the PDCCH candidate, in a case that a network configures/activates/indicates a TCI, the beam information is the TCI of the cell/TRP associated with the CSS set; or for an uplink channel or signal scheduled by/associated with the DCI monitored on the PDCCH candidate, in a case that a network configures/activates/indicates TCI/space-related information, the beam information is the TCI/space-related information of the cell/TRP associated with the CSS set; or in a case that a network configures/activates/indicates TCI/space-related information, an RS in the TCI/space-related information belongs to the cell/TRP associated with the CSS set.

Optionally, as an embodiment, the first information includes the default beam, and the default beam meets at least one of the following:

1) For a downlink channel or signal scheduled by/associated with the DCI monitored on the PDCCH candidate, in a case that a network does not configure/not activate/not indicate a TCI, the default beam is a beam used by the downlink channel or signal.

2) For an uplink channel or signal scheduled by/associated with the DCI monitored on the PDCCH candidate, in a case that a network does not configure/not activate/not indicate TCI/space-related information, the default beam is a beam used by the uplink channel or signal.

Optionally, as an embodiment, the first information includes the default beam, and a reference signal associated with the default beam includes at least one of the following: a synchronization signal and PBCH block SSB during initial access of the cell; a quasi-co-location reference signal of a control resource set CORESET with a minimum number associated with an active band width part BWP; the quasi-co-location reference signal of the CORESET with the minimum number associated with the active BWP, where the active BWP corresponds to a TRP; a quasi-co-location reference signal of a TCI with a minimum number associated with the active BWP; or a quasi-co-location reference signal of an active TCI with a minimum number associated with the active BWP.

Optionally, as an embodiment, the first information includes the default beam, where a network activates use of the default beam, and/or the terminal supports the use of the default beam.

Optionally, as an embodiment, the first information includes the default beam, and that the terminal monitors the PDCCH candidate on the CSS set includes: the terminal monitors the PDCCH candidate on the CSS set in a case that a network does not configure/not activate/not indicate the TCI.

Optionally, as an embodiment, the scrambling information includes at least one of the following: a physical downlink control channel demodulation reference signal scrambling identity pdcch-DMRS-ScramblingID; a scrambling identity ScramblingId; a data scrambling identity physical downlink shared channel dataScramblingIdentityPDSCH; a hopping identity hoppingId; or a data scrambling identity physical uplink shared channel dataScramblingIdentityPUSCH.

Optionally, as an embodiment, the RNTI includes at least one of the following: a cell radio network temporary identity C-RNTI; a modulation and coding strategy cell radio network temporary identity mcs-C-RNTI; a configuration scheduling radio network temporary identity CS-RNTI; a system information radio network temporary identity SI-RNTI; a paging radio network temporary identity P-RNTI; a random access radio network temporary identity RA-RNTI; or a temporary cell radio network temporary identity TC-RNTI.

Optionally, as an embodiment, that the terminal monitors the PDCCH candidate on the CSS set is performed in a case that at least one of the following cases is met: at least one CORESET being switched to/associated with a target cell/adjacent cell; a special TRP being switched to/associated with the target cell/adjacent cell; the anchor node being switched to/associated with the target cell/adjacent cell; the anchor node remaining unchanged, and in a case that there being a plurality of TRPs, a cell associated with a TRP of a non-anchor node being switched to/associated with the target cell/adjacent cell; configuration information of a new cell is used; a PDCCH being switched to/associated with the target cell/adjacent cell; or switching/associating a special cell (sPcell) to/with the target cell/adjacent cell.

Optionally, as an embodiment, being switched to/associated with the target cell/adjacent cell includes at least one of the following: cell/TRP identification information of the target cell/adjacent cell being associated/configured in configuration information; beam reference information being associated with the target cell/adjacent cell; or the beam reference information of the associated CORESET being associated with the target cell/adjacent cell.

Optionally, as an embodiment, that the cell/TRP identification information of the target cell/adjacent cell is associated/configured in configuration information includes: the cell/TRP identification information of the target cell/adjacent cell being configured in a TCI; the cell/TRP identification information of the target cell/adjacent cell in a QCL reference signal being configured in the TCI; and the QCL reference signal in the TCI being associated with the target cell/adjacent cell.

For the terminal 300 according to this embodiment of this application, reference may be made to the process of the method 200 corresponding to the embodiments of this application. Moreover, the units/modules in the terminal 300 and the other operations and/or functions above are to implement the corresponding processes in the method 200 and achieve the same or equivalent technical effects. For brevity, details are not described herein again.

The terminal in this embodiment of this application may also be a component, an integrated circuit, or a chip in a terminal. The apparatus may be a mobile terminal or may be a non-mobile terminal. Exemplarily, the mobile terminal may include, but is not limited to, the types of terminals 11 listed above, and the non-mobile terminal may be a server, a network attached storage (NAS), a personal computer (PC), a television (TV), a teller machine, a self-service machine, or the like, which is not limited in this embodiment of this application.

The terminal in this embodiment of this application may be an apparatus with an operating system. The operating system may be an Android operating system, may be an ios operating system, or may be another possible operating system, which is not limited in this embodiment of this application.

The terminal provided in this embodiment of this application can implement processes implemented by the method embodiment shown in FIG. 2 and achieve the same technical effects. To avoid repetition, details are not described herein again.

Optionally, as shown in FIG. 4, an embodiment of this application further provides a communication device 400, including a processor 401, a memory 402, and a program or an instruction stored on the memory 402 and executable on the processor 401. For example, in a case that the communication device 400 is a terminal, the program or the instruction, when executed by the processor 401, implements the processes of the foregoing CSS monitoring method embodiment and achieves the same technical effects.

Figure 5:
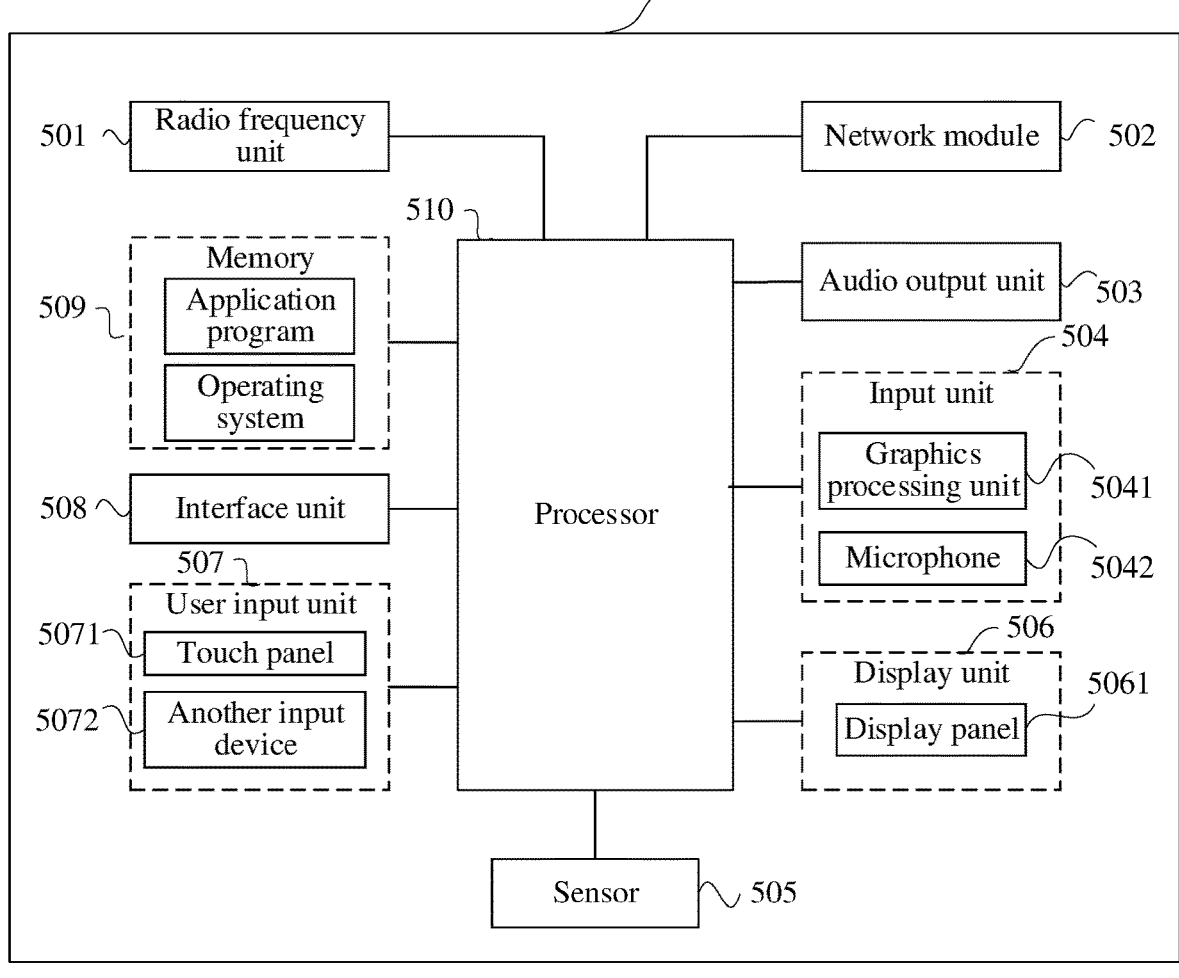
FIG. 5 is a schematic structural diagram of a terminal according to an embodiment of this application.

FIG. 5 is a schematic diagram of a hardware structure of a terminal according to an embodiment of this application.

The terminal 500 includes, but is not limited to: components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that the terminal 500 may further include a power supply (such as a battery) for supplying power to the components. The power supply may be logically connected to the processor 510 through a power supply management system, thereby implementing functions, such as charging, discharging, and power consumption management through the power supply management system. The terminal structure shown in FIG. 5 does not constitute a limitation to the terminal, and the terminal may include more or fewer components than those shown in the figure, or some components may be combined, or a different component deployment may be used. Details are not described herein again.

It should be understood that in this embodiment of this application, the input unit 504 may include a graphics processing unit (GPU) 5041 and a microphone 5042, and the graphics processing unit 5041 processes image data of still images or videos obtained by an image capture device (such as a camera) in a video capture mode or an image capture mode. The display unit 506 may include a display panel 5061, and the display panel 5061 may be configured in a form such as a liquid crystal display or an organic light-emitting diode. The user input unit 507 includes a touch panel 5071 and another input device 5072. The touch panel 5071 is also referred to as a touch screen. The touch panel 5071 may include two parts: a touch detection apparatus and a touch controller. The another input device 5072 may include, but is not limited to, a physical keyboard, a functional key (such as a volume control key or a switch key), a track ball, a mouse, and a joystick, and details are not described herein again.

In this embodiment of this application, after the radio frequency unit 501 receives downlink data from a network side device, the downlink data is sent to the processor 510 for processing. In addition, uplink data is sent to the network side device. Generally, the radio frequency unit 501 includes, but is not limited to, an antenna, at least one amplifier, a transceiver, a coupler, a low noise amplifier, a duplexer, and the like.

The memory 509 may be configured to store a software program or an instruction and various data. The memory 509 may mainly include a program or instruction storage area and a data storage area. The program or instruction storage area may store an operating system, an application program or an instruction required by at least one function (such as a sound playback function and an image display function), and the like. In addition, the memory 509 may include a high-speed random access memory, and may also include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, such as at least one disk storage device, a flash memory device, or another non-volatile solid-state storage device.

The processor 510 may include one or more processing units. Optionally, the processor 510 may integrate an application processor and a modem processor, where the application processor mainly processes an operating system, a user interface, an application program, or an instruction, and the modem processor mainly processes wireless communication, such as a baseband processor. It can be understood that the modem processor may not be integrated into the processor 510.

The processor 510 is configured to monitor a PDCCH candidate on a CSS set, where the terminal uses same first information as an anchor node, or uses same first information as a cell/transmitting receiving point TRP associated with the CSS set.

In this embodiment of this application, a terminal may use same first information as an anchor node or use same first information as a cell/TRP associated with a CSS set to monitor a PDCCH candidate on the CSS set, which can avoid the problem such as mismatch of transmission parameters and improve communication effectiveness.

The terminal provided in this embodiment of this application can further implement the processes of the foregoing CSS monitoring method embodiment and achieve the same technical effects. To avoid repetition, details are not described herein again.

An embodiment of this application further provides a non-transitory readable storage medium, storing a program or an instruction, where the program or the instruction, when executed by a processor, implements the processes of the foregoing CSS monitoring method embodiment and achieves the same technical effects. To avoid repetition, details are not described herein again.

The processor may be a processor in the terminal in the foregoing embodiments. The non-transitory readable storage medium includes a non-transitory computer-readable storage medium such as a read-only memory (ROM), a random access memory (RAM), a magnetic disk, or an optical disc.

An embodiment of this application further provides a chip, including a processor and a communication interface, where the communication interface is coupled to the processor, and the processor is configured to run a program or an instruction to implement the processes of the foregoing CSS monitoring method embodiment and achieve the same technical effects. To avoid repetition, details are not described herein again.

It should be understood that the chip mentioned in this embodiment of this application may also be referred to as a system-level chip, a system chip, a chip system, a system on chip, or the like.

An embodiment of this application further provides a computer program product stored in a non-volatile memory, where the computer program product is executed by at least one processor to implement the processes of the foregoing CSS monitoring method embodiment and achieve the same technical effects. To avoid repetition, details are not described herein again.

An embodiment of this application further provides a communication device, configured to implement the processes the foregoing CSS monitoring method embodiment and achieve the same technical effects. To avoid repetition, details are not described herein again.

It should be noted that the terms "include", "comprise", or any other variation thereof in this specification is intended to cover a non-exclusive inclusion. In this way, a process, method, object, or apparatus that includes a series of elements not only includes such elements, but also includes other elements not specified expressly, or further includes inherent elements of the process, method, object, or apparatus. Without more limitations, elements defined by the sentence "including one" does not exclude that there are still another same element in the process, method, object, or apparatus which includes the element. In addition, it should be noted that the scope of the methods and apparatuses in the implementations of this application is not limited to performing functions in an order shown or discussed, but may further include performing functions in a basically simultaneous manner or a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing implementations. The foregoing implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. A common search space (CSS) monitoring method, comprising:
monitoring, by a terminal, a physical downlink control channel (PDCCH) candidate on a CSS set; wherein
the terminal uses same first information as an anchor node;
wherein monitoring, by the terminal, the PDCCH candidate on the CSS set is performed in a case that at least one of following cases is met:
at least one CORESET being switched to/associated with a target cell/adjacent cell;
a special TRP being switched to/associated with the target cell/adjacent cell;
the anchor node being switched to/associated with the target cell/adjacent cell;
the anchor node remaining unchanged, and in a case that there are a plurality of TRPs, a cell associated with a TRP of a non-anchor node being switched to/associated with the target cell/adjacent cell;
configuration information of a new cell being used;
a PDCCH being switched to/associated with the target cell/adjacent cell; or
a special cell (sPcell) being switched to/associated with the target cell/adjacent cell;
wherein being switched to/associated with the target cell/adjacent cell comprises:
cell/TRP identification information of the target cell/adjacent cell being associated/configured in configuration information;
wherein using the same first information as the anchor node comprises at least one of following:
using the same first information as the anchor node in a case that the terminal monitors a PDCCH candidate on a Type0-PDCCH CSS set;
using the same first information as the anchor node in a case that the terminal monitors a PDCCH candidate on a Type0A-PDCCH CSS set; or using the same first information as the anchor node in a case that the terminal monitors a PDCCH candidate on a Type2-PDCCH CSS set.

2. The method according to claim 1, wherein the first information is used in at least one of following cases:

a case that the terminal monitors the PDCCH candidate on the CSS set; or a case that the terminal transmits a target channel or signal; wherein the target channel or signal is scheduled by/associated with downlink control information (DCI) monitored on the PDCCH candidate.

3. The method according to claim 1, wherein the first information comprises at least one of following:

cell configuration information;

related configuration information of the CSS set;

beam information;

a default beam;

a pathloss reference reference signal;

timing-related information;

scrambling information; or a radio network temporary identity (RNTI).

4. The method according to claim 3, wherein the first information comprises the beam information, wherein for a downlink channel or signal scheduled by/associated with the DCI monitored on the PDCCH candidate, in a case that a network configures/activates/indicates a TCI, the beam information is the TCI of a cell/TRP associated with the CSS set; or for an uplink channel or signal scheduled by/associated with the DCI monitored on the PDCCH candidate, in a case that a network configures/activates/indicates TCI/space-related information, the beam information is TCI/space-related information of the cell/TRP associated with the CSS set; or in a case that a network configures/activates/indicates TCI/space-related information, a reference signal in the TCI/space-related information belongs to the cell/TRP associated with the CSS set.

5. The method according to claim 3, wherein the first information comprises the default beam, and the default beam meets at least one of following:

for a downlink channel or signal scheduled by/associated with the DCI monitored on the PDCCH candidate, in a case that a network does not configure/not activate/not indicate a TCI, the default beam is a beam used by the downlink channel or signal; or for an uplink channel or signal scheduled by/associated with the DCI monitored on the PDCCH candidate, in a case that a network does not configure/not activate/not indicate TCI/space-related information, the default beam is a beam used by the uplink channel or signal; and/or the first information comprises the default beam, and a reference signal associated with the default beam comprises at least one of following:

a synchronization signal and PBCH block (SSB) during initial access of the cell;

a quasi-co-location reference signal of a control resource set (CORESET) with a minimum number associated with an active Bandwidth part (BWP);

the quasi-co-location reference signal of the CORESET with the minimum number associated with the active BWP, wherein the active BWP corresponds to a TRP;

a quasi-co-location reference signal of a TCI with a minimum number associated with the active BWP; or a quasi-co-location reference signal of an active TCI with a minimum number associated with the active BWP; and/or the first information comprises the default beam, wherein a network activates use of the default beam, and/or the terminal supports the use of the default beam.

6. The method according to claim 3, wherein the first information comprises the default beam, and monitoring, by the terminal, the PDCCH candidate on the CSS set comprises:

monitoring, by the terminal, the PDCCH candidate on the CSS set in a case that a network does not configure/not activate/not indicate the TCI.

7. The method according to claim 3, wherein the scrambling information comprises at least one of following:

a physical downlink control channel demodulation reference signal scrambling identity (pdcch-DMRS-ScramblingID);

a scrambling identity (ScramblingId);

a data scrambling identity physical downlink shared channel (dataScramblingIdentityPDSCH);

a hopping identity (hoppingId); or a data scrambling identity physical uplink shared channel (dataScramblingIdentityPUSCH).

8. The method according to claim 3, wherein the RNTI comprises at least one of following:

a cell radio network temporary identity (C-RNTI);

a modulation and coding strategy cell radio network temporary identity (mcs-C-RNTI);

a configuration scheduling radio network temporary identity (CS-RNTI);

a system information radio network temporary identity (SI-RNTI);

a paging radio network temporary identity (P-RNTI);

a random access radio network temporary identity (RA-RNTI); or a temporary cell radio network temporary identity (TC-RNTI).

9. The method according to claim 1, wherein being switched to/associated with the target cell/adjacent cell further comprises at least one of following:

beam reference information being associated with the target cell/adjacent cell; or beam reference information of the associated CORESET being associated with the target cell/adjacent cell.

10. The method according to claim 1, wherein that the cell/TRP identification information of the target cell/adjacent cell is associated/configured in the configuration information comprises:

the cell/TRP identification information of the target cell/adjacent cell being configured in a TCI;

the cell/TRP identification information of the target cell/adjacent cell in a quasi-co-location (QCL) reference signal being configured in the TCI; and the QCL reference signal in the TCI being associated with the target cell/adjacent cell.

11. A terminal, comprising a processor, a memory, and a program or an instruction stored on the memory and executable on the processor, wherein the program or the instruction, when executed by the processor, causes the terminal to perform:

monitoring a physical downlink control channel (PDCCH) candidate on a CSS set; wherein the terminal uses same first information as an anchor node;

wherein monitoring the PDCCH candidate on the CSS set is performed in a case that at least one of following cases is met:

at least one CORESET being switched to/associated with a target cell/adjacent cell;

a special TRP being switched to/associated with the target cell/adjacent cell;

the anchor node being switched to/associated with the target cell/adjacent cell;

the anchor node remaining unchanged, and in a case that there are a plurality of TRPs, a cell associated with a TRP of a non-anchor node being switched to/associated with the target cell/adjacent cell;

configuration information of a new cell being used;

a PDCCH being switched to/associated with the target cell/adjacent cell; or a special cell (sPcell) being switched to/associated with the target cell/adjacent cell;

wherein being switched to/associated with the target cell/adjacent cell comprises:

cell/TRP identification information of the target cell/adjacent cell being associated/configured in configuration information;

wherein using the same first information as the anchor node comprises at least one of following:

using the same first information as the anchor node in a case that the terminal monitors a PDCCH candidate on a Type0-PDCCH CSS set;

using the same first information as the anchor node in a case that the terminal monitors a PDCCH candidate on a Type0A-PDCCH CSS set; or using the same first information as the anchor node in a case that the terminal monitors a PDCCH candidate on a Type2-PDCCH CSS set.

12. The terminal according to claim 11, wherein the first information comprises at least one of following:

cell configuration information;

related configuration information of the CSS set;

beam information;

a default beam;

a pathloss reference reference signal;

timing-related information;

scrambling information; or a radio network temporary identity (RNTI).

13. The terminal according to claim 11, wherein the first information is used in at least one of following cases:

a case that the terminal monitors the PDCCH candidate on the CSS set; or a case that the terminal transmits a target channel or signal; wherein the target channel or signal is scheduled by/associated with downlink control information (DCI) monitored on the PDCCH candidate.

14. The terminal according to claim 11, wherein the first information comprises a transmission configuration indicator (TCI); wherein a reference signal indicated by a TCI identifier of the CSS set belongs to a cell/TRP associated with the CSS set; and the reference signal indicated by the TCI identifier of the CSS set does not belong to a cell/TRP unassociated with the CSS set.

15. A non-transitory readable storage medium, storing a program or an instruction, wherein the program or the instruction, when executed by a processor of a terminal, causes the terminal to perform:

monitoring a physical downlink control channel (PDCCH) candidate on a CSS set; wherein the terminal uses same first information as an anchor node;

wherein monitoring the PDCCH candidate on the CSS set is performed in a case that at least one of following cases is met:

at least one CORESET being switched to/associated with a target cell/adjacent cell;

a special TRP being switched to/associated with the target cell/adjacent cell;

the anchor node being switched to/associated with the target cell/adjacent cell;

the anchor node remaining unchanged, and in a case that there are a plurality of TRPs, a cell associated with a TRP of a non-anchor node being switched to/associated with the target cell/adjacent cell;

configuration information of a new cell being used;

a PDCCH being switched to/associated with the target cell/adjacent cell; or a special cell (sPcell) being switched to/associated with the target cell/adjacent cell;

wherein being switched to/associated with the target cell/adjacent cell comprises:

cell/TRP identification information of the target cell/adjacent cell being associated/configured in configuration information;

wherein using the same first information as the anchor node comprises at least one of following:

using the same first information as the anchor node in a case that the terminal monitors a PDCCH candidate on a Type0-PDCCH CSS set;

using the same first information as the anchor node in a case that the terminal monitors a PDCCH candidate on a Type0A-PDCCH CSS set; or using the same first information as the anchor node in a case that the terminal monitors a PDCCH candidate on a Type2-PDCCH CSS set.

* * * * *